US006595566B1

(12) United States Patent
Donnan

(10) Patent No.: US 6,595,566 B1
(45) Date of Patent: Jul. 22, 2003

(54) MANHOLE COVER LIFTER

(76) Inventor: Michael J. Donnan, 525 42nd St., SE., Paris, TX (US) 75462

( * ) Notice: Subject to any disclaimer, the term of this patent is extended or adjusted under 35 U.S.C. 154(b) by 0 days.

(21) Appl. No.: 09/904,810

(22) Filed: Jul. 13, 2001

(51) Int. Cl.[7] .............................................. B65G 7/12

(52) U.S. Cl. ..................................... 294/16; 294/118

(58) Field of Search .............................. 294/15–17, 28, 294/31.1, 50.8, 62, 11, 104, 106, 117, 118; 254/131, 133 R

(56) References Cited

U.S. PATENT DOCUMENTS

| | | | | | |
|---|---|---|---|---|---|
| 354,431 | A | * | 12/1886 | Moore | 294/16 |
| 1,234,565 | A | * | 7/1917 | Pugh | 294/16 |
| 1,344,174 | A | | 6/1920 | Clogston | |
| 1,465,892 | A | * | 8/1923 | Burgess | 294/16 |
| 1,514,863 | A | | 11/1924 | Rytell | |
| 1,857,979 | A | * | 5/1932 | Schaefer | 294/118 |
| 1,933,384 | A | * | 10/1933 | Moylan | 294/16 X |
| 2,016,356 | A | * | 10/1935 | Alberg | 294/118 |
| 2,832,628 | A | | 4/1958 | Turnbull | 294/17 |
| 2,846,259 | A | | 8/1958 | Sadler | 294/15 |
| 3,362,684 | A | | 1/1968 | Davenport | 254/131 |
| 3,837,622 | A | | 9/1974 | Gale | 254/131 |
| 3,985,338 | A | | 10/1976 | Herrmann | 254/131 |
| 4,076,217 | A | | 2/1978 | Haller et al. | 254/131 |
| 4,181,290 | A | | 1/1980 | Affolter | 254/131 |
| 4,312,530 | A | | 1/1982 | Young | 294/16 |
| 4,482,182 | A | | 11/1984 | Mortensen | 294/15 |
| 4,572,566 | A | | 2/1986 | Terrington | 294/118 |
| 4,650,232 | A | | 3/1987 | Perry | 294/15 |
| 4,778,211 | A | | 10/1988 | Gabriel | 294/115 |
| 4,929,010 | A | | 5/1990 | Lahti | 294/16 |
| 4,991,893 | A | | 2/1991 | Gordon et al. | 294/17 |
| 5,004,282 | A | * | 4/1991 | Perry | 294/16 |
| 5,070,564 | A | | 12/1991 | Fey | 7/170 |
| 5,435,611 | A | | 7/1995 | Campbell et al. | 294/16 |
| 5,462,385 | A | | 10/1995 | Mohlengraft | 404/25 |
| 5,775,674 | A | | 7/1998 | Bigham | 254/131 |
| 5,865,425 | A | | 2/1999 | Meadows | 254/131 |
| 5,871,244 | A | * | 2/1999 | Langford | 294/16 |
| 6,276,732 | B1 | * | 8/2001 | Hauss | 294/16 |

FOREIGN PATENT DOCUMENTS

| | | | | |
|---|---|---|---|---|
| CH | 170264 | * | 9/1934 | 294/16 |

* cited by examiner

*Primary Examiner*—Dean J. Kramer
(74) *Attorney, Agent, or Firm*—Conley Rose, P.C.; Albert C. Metrailer; Michael W. Piper

(57) ABSTRACT

A manually operated manhole cover lifter comprising two substantially linear members connected by a pivot in the form of scissors or tongs. The lower end of each member has a hook adapted for engaging a cover recess and the upper end has a handle for manual engagement. The hook angles are selected together with the pivot to hook distance to provide secure engagement of the cover when the hooks are inserted into cover apertures. The tool may be used by one or two people standing in an upright position to lift and move a cover from, or place a cover on, a manhole.

3 Claims, 4 Drawing Sheets

MANHOLE COVER LIFTER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to an apparatus for lifting and moving manhole covers and more particularly to a scissors-style or tong-style manhole lifter which may be manually operated by one or two people.

There are a number of manhole cover lifting and moving devices disclosed in the prior art. For example, U.S. Pat. No. 4,076,217 discloses a lever in combination with a scissors-style lifting means and a rotating fulcrum for lifting and then pivoting a manhole cover about the rotating fulcrum and away from the manhole. U.S. Pat. Nos. 2,832,628 and 4,991,893 each disclose a lever in combination with a chain and one or more hooks for lifting manhole covers. Each of these prior devices comprises several parts which must be separately manipulated or adjusted or connected to a manhole cover before the device can be used for lifting the cover. These devices normally require that someone stoop or bend over to attach a hook or hooks to the cover by hand before moving to an upright position for using the device to actually lift and move the cover.

It is desirable to have a manhole cover lifter which is very simple, has no parts which can be separated and misplaced, and can be attached to a manhole cover while standing upright and used immediately for lifting and moving the cover. By removing the cover while standing upright, the risk of personal injury may be reduced. Also, lifting and moving the cover often proves easier than trying to slide or drag it away from the manhole.

BRIEF SUMMARY OF THE INVENTION

A manhole cover lifter according to the present invention comprises a pair of substantially linear members, e.g. bars, coupled by a pivot or hinge in the style of scissors or tongs. Each member has a handle on its upper end adapted for manual engagement and a hook on its lower end adapted for engaging lifting apertures in manhole covers. Each hook is angled toward the other at angles related to the distances between the pivot point and the hooks to properly engage the cover apertures.

DETAILED DESCRIPTION OF THE INVENTION

Figure 1A:
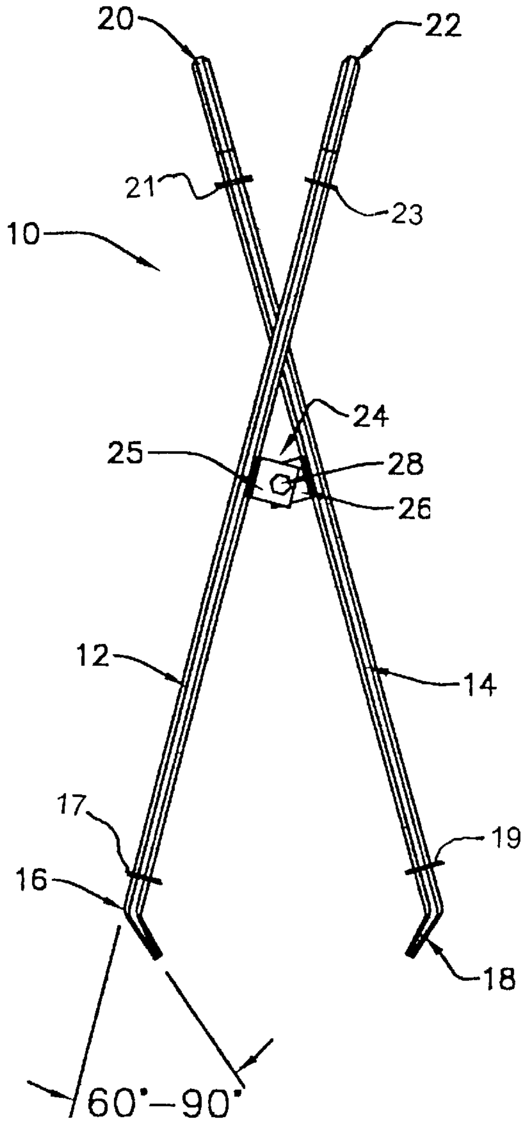
FIGS. 1A and 1B provide front and side views of a manhole cover lifter according present invention.
Figure 1B:
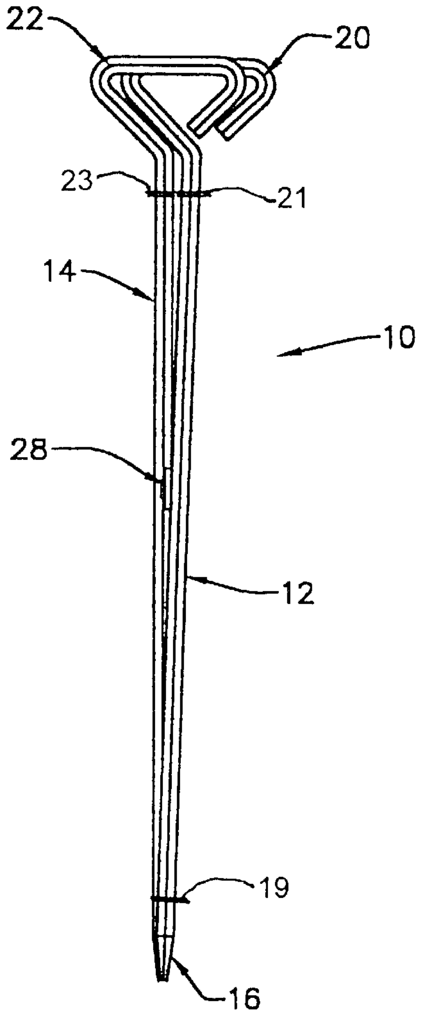

With reference to FIGS. 1A and 1B, an embodiment of the manhole cover lifter of the present invention will be described. The lifter 10 is formed primarily from two substantially linear members 12 and 14. In this embodiment, the members 12 and 14 are formed from solid steel one-half inch hex bar. Other strong linear members such as round or square or flat (i.e. rectangular cross section) solid steel bar, hollow bar, rolled tubular stock, pipe, or small "I" beam could also be used. The members could also be made of alternative metals or of non-metallic materials such as structural plastics, glass or carbon fiber composite beams or tubes and the like. Solid hex bar has advantages of having flats for welding and being formable into the desired shapes. The members 12, 14 are referred to as linear members because in this embodiment they are made of straight bar stock. This arrangement has a number of practical benefits including ease of manufacture and use of minimal storage space when the lifter 10 is closed.

Each member 12, 14 has a hook 16, 18 on its lower end and a handle 20, 22 on its upper end respectively. As illustrated, the two members 12 and 14 may be essentially identical. The references to upper and lower ends of the members 12, 14 is made with respect to the lifter 10 being in the normal upright position in which it is used to lift manhole covers. Although as noted above, use of substantially straight members 12, 14 has advantages, the members 12, 14 could be somewhat curved or bent so long as the curvature or bend is taken into account in selecting the angles of hooks 16, 18. For example, a bend near the upper end may be desirable for positioning handles 20, 22 in a convenient position. A second alternative could have members with more substantial curvature or one or multiple substantial bends, such members would still need to be substantially rigid, where rigid is defined as rigid in compression as well as in tension.

In this embodiment, the two members 12, 14 are coupled by a pivot 24 at about the midpoint between lower and upper ends of the members. In this illustrated embodiment, the pivot is formed of two pieces of quarter inch thick flat steel bar 25, 26 having a length and width of one and one-half inches. One piece 26 is threaded to receive the threaded portion of a shoulder bolt 28. The other piece 25 has a smooth hole sized to accept the shoulder part of the bolt 28 forming the pivot bearing.

Other forms of pivot 24 may also be used. The pieces 25, 26 could both have holes sized to receive a standard bolt held in place by washers and a nut. Portions of the members 12, 14 could be flattened and drilled through to receive a bolt instead of using the flat bar sections 25, 26. The pivot can be any form of hinge or bearing arrangement which couples the two members 12 and 14 while allowing them to move relative to each other in substantially the same plane perpendicular to the axis of the bolt, axle, pin etc. which couples the members 12, 14.

The lifter 10 has the general form of, and moves like, scissors or tongs. The terms scissors and tongs are used herein in their conventional sense of comprising two pieces joined by a pivot or hinge with each piece extending at least a small distance past the pivot or hinge on each side, but not in the sense of having two blades for cutting.

The hooks 16, 18 shown in FIGS. 1A and 1B are formed by heating the ends of the members 12 and 14 and then forming, i.e. tapering, and bending the ends into the illustrated shape. The hooks may be cold formed if desired and if compatible with the material chosen. In this embodiment, the hooks are angled by about 60 to 90 degrees, and preferably by about 70 to 75 degrees, relative to the central axis of the linear members 12, 14. If members 12, 14 are curved or bent, the angles would be measured relative to straight lines between the pivot 24 and the hooks 16, 18. This angle range is appropriate for this embodiment which has the pivot 24 positioned about fourteen to eighteen inches from the hooks 16 and 18. The hooks 16, 18 could be separate parts welded, as indicated at 17 for hook 16 and at 19 for hook 18, or otherwise affixed to the lower ends of members 12, 14. Use of separate parts would allow use of a different material, e.g. hardened or tempered steel, for the hooks 16, 18 and may be especially useful if members 12, 14 are formed from tubular metal or composite stock.

In FIGS. 1A and 1B, the handles 20 and 22 are formed by heating and bending the upper ends of members 12 and 14 into triangular shaped handles which lie in a plane normal to the plane in which hooks 16 and 18 lie and in which the members 12, 14 move. Other shapes of handles may be formed from or attached to the upper ends of member 20 and 22. For example, a simple "L" shaped handle could be formed by a single ninety-degree bend in the upper ends of members 12 and 14. Such an "L" shaped handle could be positioned in the plane of hooks 16 and 18, but facing away from each other instead of toward each other as the hooks 16 and 18 do. Such a handle arrangement may be useful when two people use the lifter 10. An "L" shaped handle could also be formed in the plane normal to the plane in which hooks 16 and 18 lie. Use of separate handles 20, 22 attached to the upper ends of members 12, 14 would allow use of other materials, such as structural plastic, which could be cast into shapes which may provide a more comfortable or secure manual grip. Use of separate handles may be especially useful of members 12, 14 are formed from metal or composite tubular stock. For example, handles 20, 22 may be welded to members 14, 12 as indicated at 21, 23. Another form of handle would be a gripping material, e.g. rubber, wrapped around and bonded to the handle ends of linear members 12 and 14 to increase the diameter and provide a more secure grip.

Figure 2:
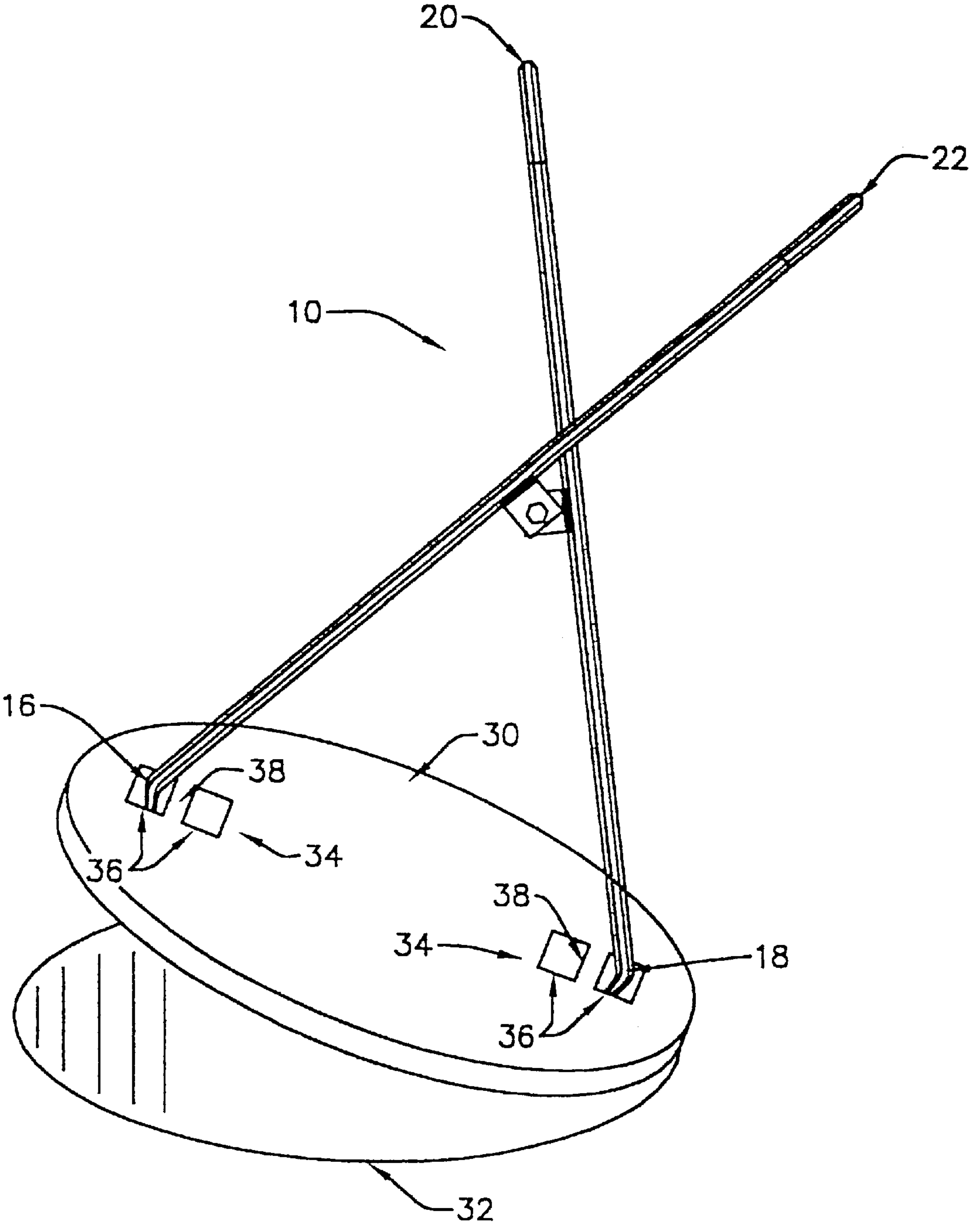
FIG. 2 is an illustration of the use of the lifter of the present invention to lift a manhole cover.

In FIG. 2 the use of the cover lifter 10 to remove a manhole cover 30 from a manhole 32 is illustrated. A typical manhole cover 30 is about twenty-four inches in diameter and has two lifting apertures 34 spaced about sixteen to twenty-two inches apart. A typical aperture 34 comprises a recess 36 in the manhole cover with a bar 38 across the recess. As illustrated, the hooks 16 and 18 may be inserted into the recesses 36 so that they reach under and engage the bars 38. By selecting appropriate angles for hooks 16 and 18, the hooks securely engage the bars 38. When the proper angles are selected, very little or no force moving the handles 20, 22 together is required to keep the hooks 16, 18 engaged with the apertures 34. When lifting force, i.e. vertical force, is applied to the handles 20, 22, the handles are naturally pulled together with sufficient force to keep the hooks 16, 18 securely engaged in apertures 34 if the hook angle is properly selected.

Other forms of apertures 34 are sometimes used on manhole covers. The apertures may be rectangular or semi-circular cutouts on the outer rim of cover 30. When this type of aperture is used on a twenty-four inch cover, the inner edges of the apertures will be about twenty-two inches apart. These types of apertures are often referred to as pick slots, because picks may be used to pry open the covers which have such apertures. Also, circular cutouts or holes about sixteen to twenty inches apart are another form of aperture used with manhole covers. These types of apertures are referred to as pick holes because picks may be used to pry open the covers which have such apertures. The lifter 10 will securely engage these other common apertures.

As shown in FIG. 2, the cover 30 may be lifted by grasping the handles 20 and 22, moving the handles apart to open the lifter 10 sufficiently to insert the hooks 16 and 18 into the apertures 34, moving handles 20 and 22 toward each other until the hooks 16 and 18 engage the bars 38 and then lifting by the handles 20 and 22. As illustrated, it may be desirable to first break the cover 30 free by rocking the lifter 10 and the cover 30 to one side. This initial step is often required because a cover tends to become stuck to the manhole top ring by rust or dirt or paving materials which get into the space between the cover and the top ring. Once this is done, the cover 30 may be lifted and moved away from manhole 32. This process may be performed by one person grasping both handles 20 and 22 or by two people each grasping one of the handles. The user or users may stand in an upright position, which reduces risk of personal injury when lifting and moving heavy objects.

An alternate removal method is to continue tilting the cover as shown in FIG. 2 and then to pivot or roll the cover on its edge in the manner in which barrels are often moved on their bottom rims. This method will work best if the surfaces surrounding the manhole are hard and smooth, e.g. concrete pavement. It is also preferred that the overall length of the lifter 10 be greater when using this method to provide more tilting leverage and to keep the handles at a comfortable height after tilting.

The lifter 10 is used for replacing a cover on a manhole in essentially the same way. If the lifter 10 has been removed from the lid 30, it is reattached as described above. The lid 30 may then be lifted and moved back to the manhole by one or two people. When the cover has been placed back on the manhole, the handles 20, 22 are moved apart to release the hooks 16, 18 from the cover 30 apertures 34. Replacement can be done while standing in an upright position to minimize risk of personal injury.

If surface conditions allow, it may be desirable to tilt and roll the cover back to the manhole as described above. The ability to tilt the cover 30 and roll it on edge provides an advantage over prior art devices such as those taught in the above referenced U.S. Pat. Nos. 2,832,628 and 4,991,893 which use a chain for one connection to the cover. A chain is only a tension element and thus would not prevent the cover 30 from falling over on the user if it was tilted too much. A chain also does not allow application of twisting forces to the cover as needed to roll, and control the rolling of, the cover. The rigidity of linear members 12, 14 allows the cover 30 to be tilted up to ninety degrees and rolled on its edge while retaining control of both tilt and rotation. Even without rolling the cover, simply picking it up from the ground where it has been set aside and returning it to the open manhole is difficult to impossible to accomplish with the described chain-based systems. The chain-based systems apparently count on the use of a single pivot point on the ground about which to tilt and move the cover and are not effectively designed to lift the cover completely off of the ground and transport it in that fashion.

Figure 3A:
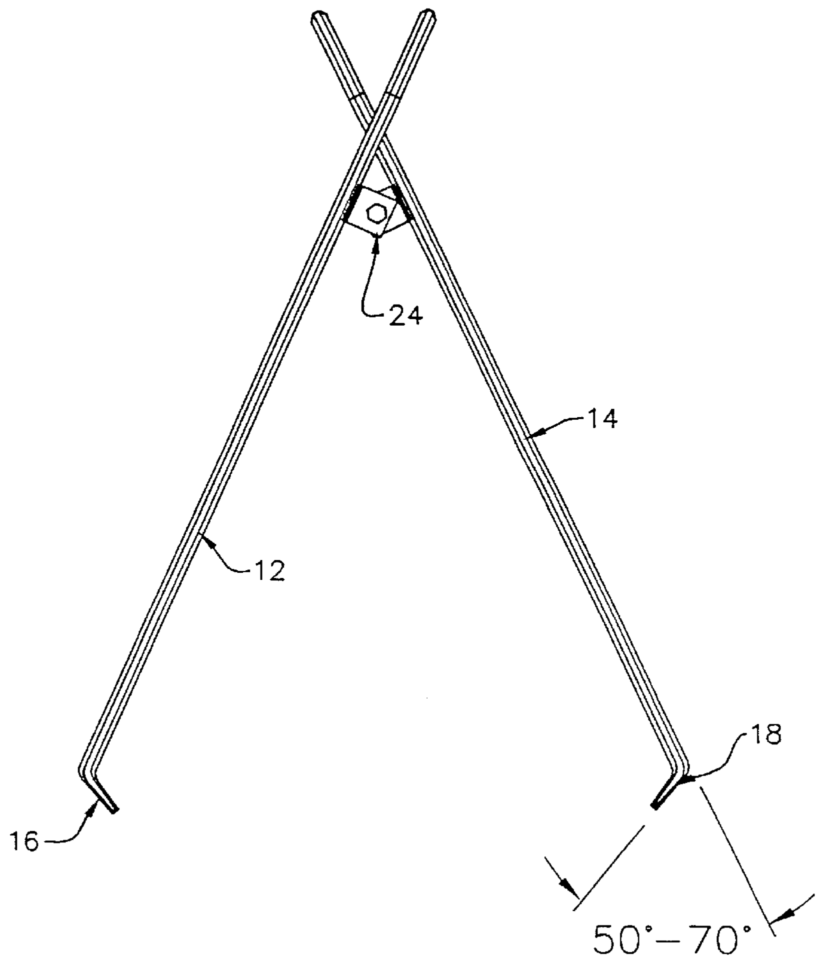
FIGS. 3A and 3B provide front and side views of a second embodiment of the invention.
Figure 3B:
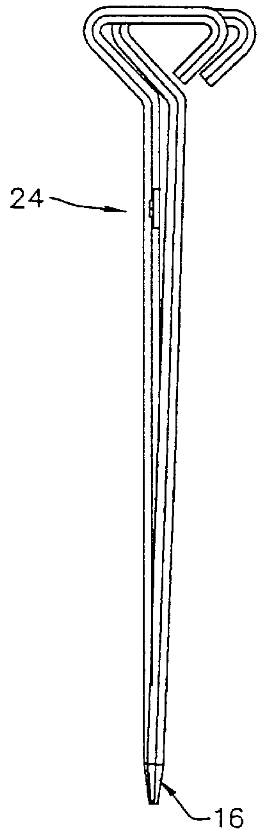

With reference to FIGS. 3A and 3B, a second embodiment of the present invention will be described. In this embodiment the parts are the same except for the location of pivot 24 and the angle of hooks 16 and 18. In the FIGS. 1A and 1B embodiment, the pivot 24 is about fourteen to eighteen inches from the hooks 16 and 18 and the hooks have an angle of about 60 to 90 degrees relative to the main axis of members 12 and 14. These dimensions result in the hooks 16, 18 making good engagement with cover apertures which are sixteen to twenty-two inches apart which corresponds to the common twenty-four inch diameter cover. In the FIGS. 3A and 3B embodiment, the pivot 24 is positioned about twenty to twenty-four inches from the hooks 16, 18 and the hooks are angled at about 50 to 70 degrees, and preferably about 65 to 70 degrees, from the axis of members 12 and 14. This range of angles again provides good engagement between the hooks 16, 18 and the typically sized and spaced cover apertures 34, when the hook to pivot spacing is about twenty to twenty-four inches. An about twenty-four inch pivot 24 to hooks 16, 18 spacing is considered about the maximum practical spacing between pivot 24 and hooks 16, 18 for normally sized manhole covers.

Figure 4A:
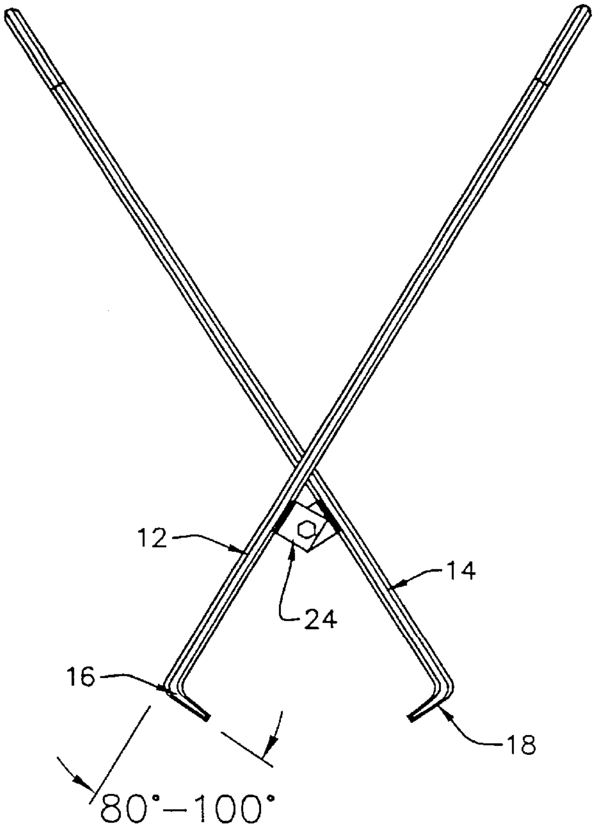
FIGS. 4A and 4B provide front and side views of a third embodiment of the present invention.
Figure 4B:
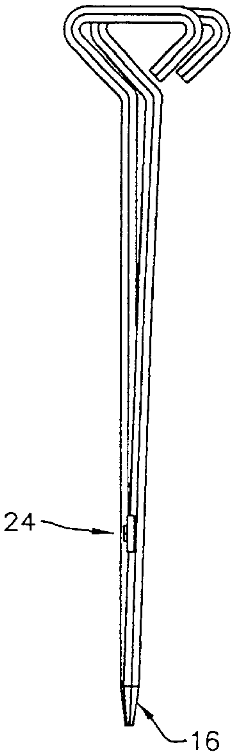

FIGS. 4A and 4B illustrates another possible set of dimensions for the position of the pivot 24 relative to the angle of hooks 16, 18. In this case the pivot 24 is about eight to twelve inches from the hooks 16, 18. For this pivot to hook spacing, the hooks are angled about 80 to 100 degrees, and preferably about 85 to 90 degrees, from the axis of members 12 and 14. This arrangement again is adapted to provide good engagement with manhole cover apertures and an about eight inch spacing is considered about the minimum practical spacing between pivot 24 and hooks 16, 18 for normally sized manhole covers.

FIGS. 1A, 3A and 4A illustrate that the angle of hooks 16, 18 relative to the axis of member 12, 14 is related to, or proportional to, the spacing between the pivot 24 and the hooks 16, 18. As the pivot to hook spacing decreases, the hook angle should be increased to provide secure engagement of the hooks with the cover apertures. These figures also illustrate that for typical manhole covers the practical hook to pivot spacing is from about eight inches to about twenty-four inches and is desirably between fourteen to eighteen inches and more desirably about sixteen inches. Useful hook angles are between 50 and 100 degrees and are desirably between 60 to 90 degrees and more desirably between 70 and 75 degrees. In the illustrated embodiment, the overall length of the linear members 12, 14 including hooks 16, 18 and handles 20, 22 is about thirty-three inches, which places the handles 20, 22 at a comfortable height above ground level for use while standing in an upright position. The overall length may be increased to provide more leverage in breaking a cover free from the manhole, but at lengths beyond four and one-half feet, it becomes more difficult to actually lift a cover with the lifter 10. The overall lengths discussed here are intended for users of height of from about five and one-half to six feet, but other lengths may of course be selected to accommodate shorter or taller users.

The embodiments illustrated in the Figures have the hooks 16 and 18 positioned by about the same distance from pivot 24. This is not essential to the present invention. For example, member 12 could have a hook 16 to pivot distance of fourteen inches and member 14 could have a hook 18 to pivot 24 distance of eighteen inches. In this case, the angle of hook 16 may be different from the angle of hook 18, but each would be selected according to the criteria discussed herein. The effect of this arrangement would be to place the handles 20, 22 offset from the center of the manhole cover 30 when it is initially secured to the cover. This may provide an advantage when the lifter 10 is used by one person, by giving that person more leverage to tilt the cover while standing to the side of the cover.

In similar fashion, it is not necessary that the distances between handles 20, 22 and the pivot 24 be the same. Some difference between these distances may provide the user with an advantage, especially when only one person is using the lifter 10.

While the present invention has been illustrated and described in terms of particular apparatus and methods of use, it is apparent that equivalent parts may be substituted of those shown and other changes can be made within the scope of the present invention as defined by the appended claims.

What I claim as my invention is:

1. Apparatus for lifting a manhole cover having two lifting apertures comprising:

a pair of substantially linear members each having a handle for manual engagement on one end and a hook on the opposite end adapted for engaging manhole cover lifting apertures, and a pivot coupling said linear members at a point intermediate said handle ends and said hook ends, said linear members crossing each other at said pivot; and wherein said pivot comprises two pieces of flat steel bar stock and a bolt, one of said bar stock pieces welded to a first of said linear members and having a hole for receiving said bolt and the other of said bar stock pieces welded to a second of said linear members and having hole for receiving said bolt.

2. Apparatus for lifting a manhole cover having two lifting apertures comprising:

a pair of substantially linear members each having a handle for manual engagement on one end and a hook on the opposite end adapted for engaging manhole cover lifting apertures, and a pivot coupling said linear members at a point intermediate said handle ends and said hook ends, said linear members crossing each other at said pivot; and wherein said pivot comprises two pieces of flat steel bar stock and a shoulder bolt, one of said bar stock pieces welded to a first of said linear members and having a threaded hole for receiving a threaded section of said shoulder bolt and the other of said bar stock pieces welded to a second of said linear members and having a smooth hole for receiving a smooth shoulder portion of said shoulder bolt to form a bearing.

3. A manhole cover lifter for lifting manhole covers having two lifting apertures comprising:

first and second substantially rigid members coupled by a pivot in the form of scissors, each member having an upper end and a lower end, where at least one the members has a handle on its upper end for manual grasping, each of the members has a hook on its lower end adapted to engage said lifting apertures, and the lengths of said members between said pivot and the lower ends of said members are substantially the same; and wherein said pivot comprises two pieces of flat steel stock and a shoulder bolt, one of said flat stock pieces welded to a first of said members and having a threaded hole for receiving a threaded section of said shoulder bolt and the other of said flat stock pieces welded to a second of said members and having a smooth hole for receiving a smooth shoulder portion of said shoulder bolt to form a bearing.

* * * * *